United States Patent

Romano

[11] 4,015,503
[45] Apr. 5, 1977

[54] CAPPED WHEEL NUT
[75] Inventor: Ralph Romano, Brighton, Mich.
[73] Assignee: Grand Machining Company, Detroit, Mich.
[22] Filed: May 3, 1976
[21] Appl. No.: 682,517
[52] U.S. Cl. .................................................. 85/35
[51] Int. Cl.² ...................................... F16B 37/14
[58] Field of Search .......................... 85/35, 53, 55
[56] References Cited
UNITED STATES PATENTS 1,509,528 9/1924 Richards ................................ 85/35
3,364,806 1/1968 Chaivre .................................. 85/35

Primary Examiner—Ramon S. Britts
Attorney, Agent, or Firm—Harness, Dickey & Pierce

[57] ABSTRACT

A nut for attaching an automobile wheel to a hub, having a decorative and protective cap. The nut has a first conical section engageable with the wheel and a second conical section against which the inner end of the cap is crimped. The second section is shallower than the first, and they are interconnected by a notch formed by a reversely conical surface extending transversely to the two conical sections and of a depth at the flat which is approximately equal to the metal thickness of the cap. The result is a construction which creates a strong, thickened retaining collar around the cap and affords a more secure assembly which resists impact wrenching forces.

4 Claims, 6 Drawing Figures

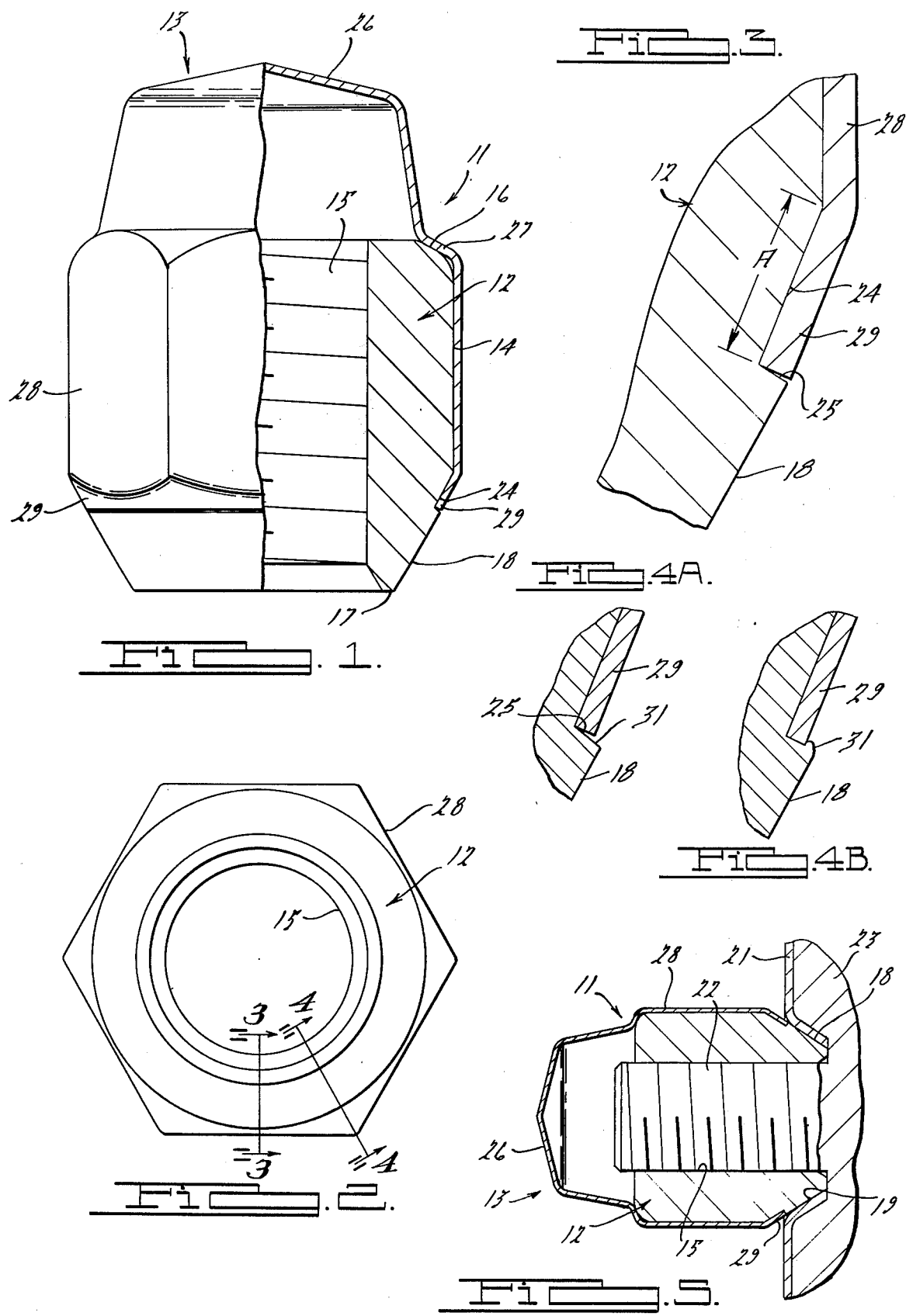

CAPPED WHEEL NUT

BACKGROUND OF THE INVENTION

1. Field of the Invention

The invention relates to capped nuts used for fastening the wheels of automotive vehicles to their hubs by threadably mounting them on lugs extending from the hubs. The caps on the nuts serve to protect them as well as form decorative exposed surfaces.

2. Description of the Prior Art

Chaivre, U.S. Pat. No. 3,364,806 disclosed a capped wheel nut in which the nut body itself has two conical sections, the first engaging the wheel and the second retaining the crimped cap end. These surfaces are interconnected, according to this patent, by a cylindrical, non-tapered land for the purpose of preventing interference between the cap and wheel while at the same time giving the appearance of a merging of the cap and conical surfaces. The Chaivre construction has been found in practice to permit only limited and discontinuous crimping of the cap end against the nut body. In order to satisfy stringent automotive requirements and prevent loosening of the cap under repeated impact wrench forces, it has been found necessary with the Chaivre construction to weld the cap to the body. This in turn has necessitated alteration of the upper cap configuration in order to provide welding surfaces.

BRIEF SUMMARY OF THE INVENTION

It is an object of the present invention to overcome some of the shortcomings of the construction shown in the Chaivre patent, and provide a novel and improved cap and nut assembly which is more secure and will not loosen under repeated wrenching forces, without the need for welding or other extraneous securing means.

It is another object to provide capped automobile wheel nut of this nature which results in a minimum of bulges or other undesired distortions of the cap.

It is also an object to provide an improved wheel nut which results in greater visual blending between the wheel and nut.

Briefly, the capped wheel nut of this invention comprises a polygonal nut body having internal threads, a first conical surface extending outwardly from one end of said nut body at a predetermined angle, said first conical surface being so dimensioned as to interfit with a conical wheel depression, a second conical surface axially adjacent said first surface and extending outwardly therefrom toward the other end of said nut body but at a substantially lesser angle than said first surface, a notched portion on said nut body interconnecting the outer end of said first conical surface and the inner end of said second conical surface, said notched portion being formed by a reversely conical surface extending transversely to said first and second conical surfaces, a domed cap having sides closely interfitting with the sides of said nut body, and portions on said cap crimped into the notch formed by said reversely conical surface, the reversely conical surface having a width approximately equal to the metal thickness of said cap.

BRIEF DESCRIPTION OF THE DRAWINGS

FIG. 1 is a partly sectioned elevational view of the capped wheel nut of this invention;

FIG. 2 is a bottom plan view;

FIG. 3 is an enlarged fragmentary cross-sectional view taken along the line 3—3 of FIG. 2;

FIG. 4A is a view similar to FIG. 3 but taken along the line 4—4 of FIG. 2, and showing the nut before swaging;

FIG. 4B is a view similar to FIG. 4A but showing the nut after swaging; and

FIG. 5 is a cross-sectional view in elevation showing the nut applied to a wheel hub.

DESCRIPTION OF THE PREFERRED EMBODIMENT

The capped wheel nut is generally indicated at 11 and comprises a nut body generally indicated at 12 and a cap generally indicated at 13. Nut body 12 is of polygonal shape, having an outer surface 14, an internally threaded surface 15, and an outer chamfered surface 16. The inner end 17 of the nut comprises a narrow flat section, and a first conical section 18 extending outwardly therefrom. This section is intended to interfit with the conventional conical depression 19 on a wheel shown partially at 21 of FIG. 5. The wheel has a plurality of such depressions 19 which fit over lugs 22 carried by a hub 23. Typically, the angle of the depressions and the angle of conical surface 18 is 30°, as indicated in FIG. 3.

A second conical surface 24 has a narrower end which starts approximately at the wider end of surface 18, and flares outwardly therefrom toward surface 14 of the nut body. Since surface 14 is of polygonal shape, conical surface 24 is not of constant width but is wider adjacent the corners between the flat sides and narrowest halfway between the corners; that is, at the centers of the flats. The flare angle of conical surface 24 is substantially less than that of surface 18; preferably, a flare angle of about 23° is provided.

At the juncture between surfaces 18 and 24 a slot is formed by a reversely conical surface 25 which extends transversely to both surfaces 18 and 24. This surface 25 is visible in FIG. 3.

Unlike nut body 12, which may be formed of low carbon steel, cap 13 is preferably formed of a non-corrosive and decorative material such as stainless steel. The cap has an outer domed portion 26, the base 27 of which engages chamfered portion 16, and polygonally shaped sides 28. These are formed to have an interference fit with side 14 of the nut body when the cap is assembled thereto so as to provide a more secure assembly. The portion 29 of cap 13 which extends beyond nut body surface 14 is crimped or swaged against conical surface 24 of the nut body. Preferably, the depth of notch surface at the flats 25 is approximately the same as the metal thickness of the cap, typically about 0.020 inches, and at the corners is slightly greater, as indicated at 31 in FIG. 4A. The length of portion 29 of the cap is such that when crimped or swaged this cap portion will extend practically to surface 25 as seen in FIG. 3. Of course, the portions of the cap adjacent the corners between flats (FIGS. 4A and 4B) will have the most crimped or swaged material, the portions at the centers of the flats having the least.

Preferably, a swaging operation is performed on nut 12 after portion 29 of the cap has been crimped, whereby portions 31 of conical surface 25 are closed down against cap portion 29. This has been found to furnish increased binding strength of the cap with respect to the nut.

Because of the use of a shallower angle for surface 24 than surface 18, a relatively long length of crimped surface, indicated by the distance A (in FIG. 3) will be obtained, also resulting in a more secure assembly. Furthermore, because the deformation of cap portion 29 is less than if a 30° slope were used, there is less unwanted cap deformation. For example, there will be no noticeable bulge of cap portion 28 at the corners between flats adjacent the crimp.

Cap portion 29 will be swaged to form a continuous, thickened, cold-worked ring or collar which, together with dome base 27, resists expansion of cap sides 28 during wrenching.

The constructional features which result in a more secure assembly could be of benefit when it is required that the nut withstand a torque test in which it is subjected to repeated on-and-off cycles using an impact wrench, and in all cases will eliminate the need of an additional adhesive or welding between the nut body and cap in order to pass such torque requirements. Welding the cap onto the nut besides being an additional expense, requires a change in the shape of the cap to provide a welding surface.

FIG. 5 shows the nut of this invention applied to a stud to hold the wheel in place. Because of the relatively shallow angle of surface 24, the cap will visually blend with the nut body more nearly than with the construction of the prior art as disclosed in the above-mentioned patent. The inner end of cap 13 will give the appearance of continuity with the adjacent surfaces and be extremely closely spaced with respect to wheel 21, improving appearance. Another advantage of the relatively shallow angle of surface 24 is further assurance that there will be no interference between the cap or nut body surfaces and the wheel, except for the contact between conical surface 18 and wheel depression 19.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. In a capped wheel nut, a polygonal nut body having internal threads, a first conical surface extending outwardly from one end of said nut body at a predetermined included angle with respect to the axis of the nut, said first conical surface being so dimensioned as to interfit with a conical wheel depression, a second conical surface axially adjacent said first surface and extending outwardly therefrom toward the other end of said nut body but at a substantially lesser included angle with respect to said axis than said first surface, a notched portion on said nut body interconnecting the outer end of said first conical surface and the inner end of said second conical surface, said notched portion being formed by a reversely conical surface extending transversely to said first and second conical surfaces, a domed cap having sides closely interfitting with the sides of said polygonal nut body, and portions on said cap swaged into the notch formed by said reversely conical surface, the reversely conical surface having a width approximately equal to the metal thickness of said cap.

2. A cap according to claim 1, said first conical surface having an angle of approximately 30°, said second conical surface having an angle of approximately 23°.

3. A cap according to claim 1, the portions of said reversely conical surface at the corners of said polygonal nut body having a depth greater than said cap metal thickness and being swaged over the adjacent swaged portions of the cap.

4. A cap according to claim 1, said nut body having a chamfered surface at its other end, said cap having a dome with a base engaging said chamfer, said swaged portions of the cap forming a continuous, thickened cold-worked ring which, together with said dome base, resists expansion of the cap sides during wrenching.

* * * * *